United States Patent
Kirk et al.

(10) Patent No.: US 12,522,517 B2
(45) Date of Patent: Jan. 13, 2026

(54) DEVICE AND METHOD FOR CONTAINING, COVERING, AND TREATING PRODUCED WATER IN A CONTAINER

(71) Applicant: EXTERRAN WATER SOLUTIONS ULC, Calgary (CA)

(72) Inventors: Todd William Kirk, Rockyview County (CA); Daniel Clifford Whitney, Cochrane (CA); Asir Thambiraja, Chennai (IN); Roger George, Katy, TX (US); Abheek Banerjee, Calgary (CA)

(73) Assignee: Exterran Water Solutions ULC, Calgary (CA)

( * ) Notice: Subject to any disclaimer, the term of this patent is extended or adjusted under 35 U.S.C. 154(b) by 239 days.

(21) Appl. No.: 18/256,041

(22) PCT Filed: Nov. 29, 2021

(86) PCT No.: PCT/CA2021/051703
§ 371 (c)(1),
(2) Date: Jun. 5, 2023

(87) PCT Pub. No.: WO2022/120463
PCT Pub. Date: Jun. 16, 2022

(65) Prior Publication Data
US 2024/0076203 A1    Mar. 7, 2024

Related U.S. Application Data

(60) Provisional application No. 63/122,237, filed on Dec. 7, 2020.

(51) Int. Cl.
*C02F 1/14* (2023.01)
*B01D 5/00* (2006.01)
(Continued)

(52) U.S. Cl.
CPC ............ *C02F 1/048* (2013.01); *B01D 5/0066* (2013.01); *C02F 1/14* (2013.01); *C02F 1/24* (2013.01);
(Continued)

(58) Field of Classification Search
CPC ... C02F 1/048; C02F 1/14; C02F 1/24; B01D 5/0066; B01D 5/006
See application file for complete search history.

(56) References Cited

U.S. PATENT DOCUMENTS

| 3,846,251 A | 11/1974 | Hay |
| 6,136,194 A | 10/2000 | Vogel et al. |

(Continued)

FOREIGN PATENT DOCUMENTS

| DE | 102006000864 A1 | 7/2007 | |
| DE | 102006000864 B4 * | 7/2007 | ............... C02F 1/14 |

OTHER PUBLICATIONS

English machine translation of DE-102006000864-B4 (Year: 2007).*
(Continued)

*Primary Examiner* — Renee Robinson
(74) *Attorney, Agent, or Firm* — Gowling WLG (Canada)

(57) ABSTRACT

An apparatus for covering a water container having an open top and treating a source water therein. The apparatus has one or more dividing walls mountable to an interior space of the water container for partitioning it into multiple water-treatment zones, and a cover mountable to at least a portion of the open top of the water container above the one or more dividing walls. Each dividing wall has or forms one or more openings for directing the source water from one water-treatment zone to the next. The cover has one or more vaulted cover sections each defining a gas chamber above the dividing walls. Each cover section has a condensation surface in the corresponding gas chamber for condensing a (Continued)

steam evaporated from the source water to clean water, and at least one water-collection channel coupled to at least one side of the condensation surface for collecting the condensed clean water.

43 Claims, 10 Drawing Sheets

(51) Int. Cl.
    *C02F 1/04*      (2023.01)
    *C02F 1/24*      (2023.01)
    *C02F 9/00*      (2023.01)

(52) U.S. Cl.
    CPC .......... *C02F 9/00* (2013.01); *C02F 2201/002* (2013.01); *C02F 2209/38* (2013.01)

(56) References Cited

U.S. PATENT DOCUMENTS

| | | |
|---|---|---|
| RE41,442 E | 7/2010 | Morgan et al. |
| 2002/0130076 A1 | 9/2002 | Merritt |
| 2004/0256299 A1* | 12/2004 | Herring, Sr. .............. C02F 9/00 210/167.3 |
| 2016/0131401 A1* | 5/2016 | Otanicar ................... C02F 1/14 62/3.3 |
| 2019/0292082 A1* | 9/2019 | Nap ........................ C02F 1/001 |

OTHER PUBLICATIONS

International Search Report of PCT Application No. PCT/CA2021/051703 dated Feb. 3, 2022.
Written Opinion of PCT Application No. PCT/CA2021/051703 dated Feb. 3, 2022.
International Preliminary Report on Patentability PCT Application No. PCT/CA2021/051703 dated Jun. 22, 2023.
A.E. Kabeel et al. "Solar still with condenser—A detailed review". Renewable and Sustainable Energy Reviews, 2016, vol. 59, pp. 839-857.
Pandey, "Effect of dried and forced air bubbling on the partial pressure of water vapour and the performance of solar still". Solar Energy, 1984, vol. 33(1), pp. 13-18.
Maria Luís Almeida e Sousa "Solar Evaporation System: Modeling and Controlling Brine Treatment Ponds", 2016.

\* cited by examiner

DEVICE AND METHOD FOR CONTAINING, COVERING, AND TREATING PRODUCED WATER IN A CONTAINER

FIELD OF THE DISCLOSURE

The present disclosure relates generally to water-treatment apparatuses and methods, and in particular to apparatuses and methods for containing, covering, and treating produced water or wastewater in containers such as wastewater tanks, fracking ponds, tailing ponds, above-ground storage tanks, and/or the like.

BACKGROUND

In wastewater treatment, the water to be treated such as wastewater from various sources and produced water from oil and gas wells is usually stored in containers such as wastewater tanks, or in containment areas such as fracking ponds, tailing ponds, above ground storage tanks, and/or the like. Such containers or containment areas may be enclosed with suitable covers for reducing emissions or evaporation from the pond, preventing odors, protecting from additional contaminants, and/or the like.

Figure 1:
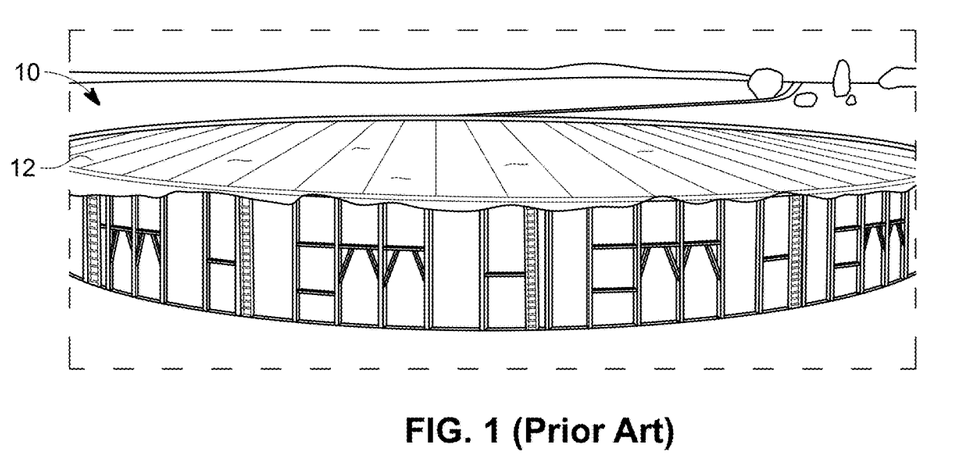
FIG. 1 (prior art) shows a conventional wastewater tank with a floating pond-cover.

For example, FIG. 1 shows a wastewater tank 10 with a floating pond-cover 12. The floating pond-cover 12 usually comprises a geomembrane floating on the surface of the wastewater with edges fixed to the tank 10 or a liner thereof. However, such floating pond-covers 12 have several disadvantages such as being difficult to remove and rainwater building up on top of the cover.

Figure 2:
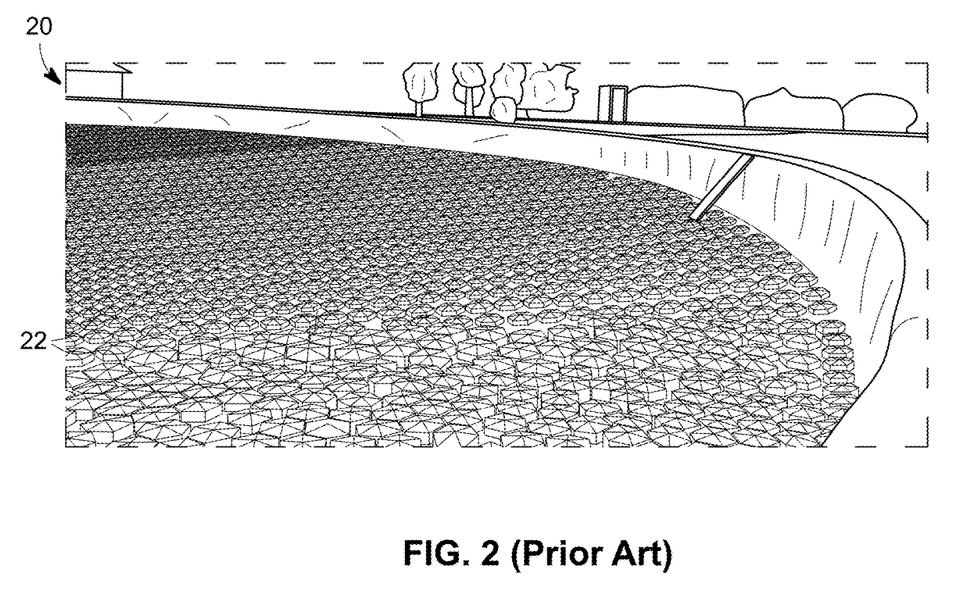
FIG. 2 (prior art) shows a conventional wastewater pond with floating covers formed by a large number of similar and symmetrical blocks.

FIG. 2 shows a wastewater pond 20 with floating covers offered by Advanced Water Treatment Technologies Inc. of Harlingen, TX, USA. The floating covers comprise a large number of similar and symmetrical blocks 22 such as spherical balls or hexagonal prisms floating on the wastewater for automatically forming a barrier on top thereof. However, the gaps between the floating blocks 22 still lead to water evaporation, and additional input of falling snow.

The Zero Liquid Discharge Desalination (Zelda) project (http://zelda.ctm.com.es/en) funded by the European Union's LIFE+ Programme (LIFE12 ENV/ES/000901) implemented a solar evaporation system having an uncovered solar evaporation pond with natural convection and a covered solar evaporation pond with forced air convection. The covered pond is made by fiberglass and vinyl ester resin and is covered by polycarbonate plates supported by a structure. It also has a system to control the ventilation and a control system of indoor air and a filling control. The covered pond has an area to recover the condensed water and the cover or dome has windows on the side that can be open. The detail of the solar evaporation system may be found at https://repositorio-aberto.up.pt/bitstream/10216/83359/2/126822.pdf.

U.S. Pat. No. RE41442 to Morgan, et al. teaches an insulated removable pond cover for settling ponds. The pond cover comprises a plurality of sealed panel units containing insulation. The panel units are linked together by means of a system of cables which pass through grommets in the panel units.

U.S. Pat. No. 6,136,194 to Vogel, et al. teaches a wastewater treatment system including at least one completely covered aerobic reactor cell and a completely covered quiescent anaerobic reactor cell. The system can also include a polishing reactor for further treating wastewater after treatment by the anaerobic reactor cell. The covered aerobic reactor cell preferably includes a pair of subcells in which a first cell includes continuous mixing and aeration of the wastewater and the second cell includes only intermittent mixing and aeration of the treated wastewater. The system optionally includes a completely covered anoxic reactor cell for treating wastewater prior to treatment by the completely covered aerobic reactor cell. The anoxic reactor cell receives partially treated wastewater recirculated from the polishing reactor. Growth media can be used in the reactor cells to enhance biological activity. The system can be used to retrofit a preexisting wastewater treatment facility.

US Patent Application Publication No. 2002/0130076 to Merritt teaches a four-pond wastewater treatment process for controlling algae and ammonia in the effluent stream. A plurality of opaque modular cover casings are floated on some or all of the surface of the aeration pond, sedimentation pond, and polishing pond to block sunlight and thereby control algae growth and suspended solids. Attached growth biomedia is submerged in the aeration pond to enhance nitrification of ammonia.

Therefore, there is always a desire for novel apparatuses and methods for containing, covering, and treating produced water or wastewater in containers such as wastewater tanks, above-ground storage tanks, tailing ponds, and/or the like.

SUMMARY

According to one aspect of this disclosure, there is provided an apparatus for covering a water container and treating a source water therein. The water container having an open top. The apparatus comprises: one or more longitudinally extending dividing walls mountable to an interior space of the water container, for partitioning the interior space of the water container into a plurality of water-treatment zones, each dividing wall comprising one or more first openings for fluid communication between adjacent water-treatment zones thereabout; and a cover mountable to at least a portion of the open top of the water container above the one or more dividing walls, the cover comprising one or more vaulted cover sections for defining one or more gas chambers above the dividing walls; each cover section comprises: a condensation surface in the corresponding gas chamber for condensing a steam evaporated from the source water in the water container to clean water, and at least one water-collection channel coupled to at least one side of the condensation surface at a lower portion thereof for collecting the clean water condensed therefrom In some embodiments, the condensation surface is an inner surface of the corresponding cover section.

In some embodiments, the condensation surface is a condensation layer separated from the corresponding cover section.

In some embodiments, the condensation layer comprises one or more packing columns for facilitating steam condensation and directing the clean water into the at least one water-collection channel.

In some embodiments, the one or more packing columns comprise at least one of coal chips, plastic rings, stone chips, and wood chips.

In some embodiments, the condensation surface is coated with a hydrophobic material for altering the surface tension to facilitate condensation.

In some embodiments, the hydrophobic material comprises oleic acid and/or polymers.

In some embodiments, the condensation surface is applied with a nano-coating for prompting condensation.

In some embodiments, the nano-coating is applied to the condensation surface using at least one of self-assembled monolayers (SAMs), ion implantation, chemical vapor deposition (CVD), physical vapor deposition (PVD), dip and spin coating, lithography, and etching processes for prompting condensation.

In some embodiments, the cover comprises at least one of a plastic material, a polycarbonate material, a composite material, and aluminum.

In some embodiments, the composite material comprises carbon fiber or fiberglass.

In some embodiments, the cover is coated with a protective material UV protection and/or strength reinforcement.

In some embodiments, the cover is coated with a light-reflective material on an exterior surface thereof.

In some embodiments, at least one of the one or more cover sections is transparent.

In some embodiments, the one or more cover sections extend along a direction parallel to that of the one or more dividing walls.

In some embodiments, the one or more cover sections extend along a direction perpendicular to that of the one or more dividing walls.

In some embodiments, each cover section comprises a semi-circular cross-section.

In some embodiments, each cover section is configured for coupling to at least one of the one or more dividing walls.

In some embodiments, at least one cover section is coupled to a float.

In some embodiments, the first openings of adjacent dividing walls are longitudinally at a distance from each other for creating a serpentine, elongated flow-path.

In some embodiments, the first openings of adjacent dividing walls are located about opposite longitudinal ends thereof for creating a serpentine, elongated flow-path.

In some embodiments, the apparatus further comprises: one or more skimming structures for collecting contaminants separated from the source water and rising upwardly to the surface.

In some embodiments, the apparatus further comprises: a first heating component for heating the source water for evaporation.

In some embodiments, the apparatus further comprises: one or more gas inlets in one or more of the plurality of water-treatment zones for injecting a first gas thereinto for forming gas bubbles in the source water for contaminants in the water to agglomerate onto and thereby rise to the top of the water being treated.

In some embodiments, a speed of injecting the first gas is controllable.

In some embodiments, the first gas is injected towards a downstream direction of a flow of the source water.

In some embodiments, the first gas comprises at least one of air, natural gas, and steam.

In some embodiments, the apparatus further comprises: a second heating component for heating the first gas.

In some embodiments, the apparatus further comprises: a blower for blowing a second gas across a surface of the source water or slightly below the surface thereof.

In some embodiments, the apparatus further comprises: one or more supporting structures; each cover section being coupled to at least one of the one or more supporting structures.

In some embodiments, the one or more supporting structures are configured for positioning outside the water container.

In some embodiments, the one or more supporting structures comprise at least one post.

In some embodiments, the one or more supporting structures are longitudinally extending; and each dividing wall is configured for extending downwardly from one of the one or more supporting structures.

In some embodiments, each dividing wall comprises one or more rubber sheets and/or cloth sheets.

In some embodiments, each dividing wall is coupled to a weight for anchoring the dividing wall in the water container.

In some embodiments, the apparatus further comprises: one or more sub-dividing walls coupled to at least one of the one or more dividing walls for subdividing one or more of the plurality of water-treatment zones, each of the one or more sub-dividing walls comprising one or more second openings for fluid communication.

In some embodiments, the dividing walls and the first openings are configured for forming an elongated flow path having a plurality of 180° turns.

In some embodiments, the dividing walls and the first openings are configured for forming an elongated flow path having a plurality of turns less than 180°.

In some embodiments, the apparatus further comprises: a humidity-control structure for controlling humidity in the one or more gas chambers in the vaulted cover sections above the dividing walls.

In some embodiments, the apparatus further comprises: a water-proof liner for deploying in the water container.

Figure 12:
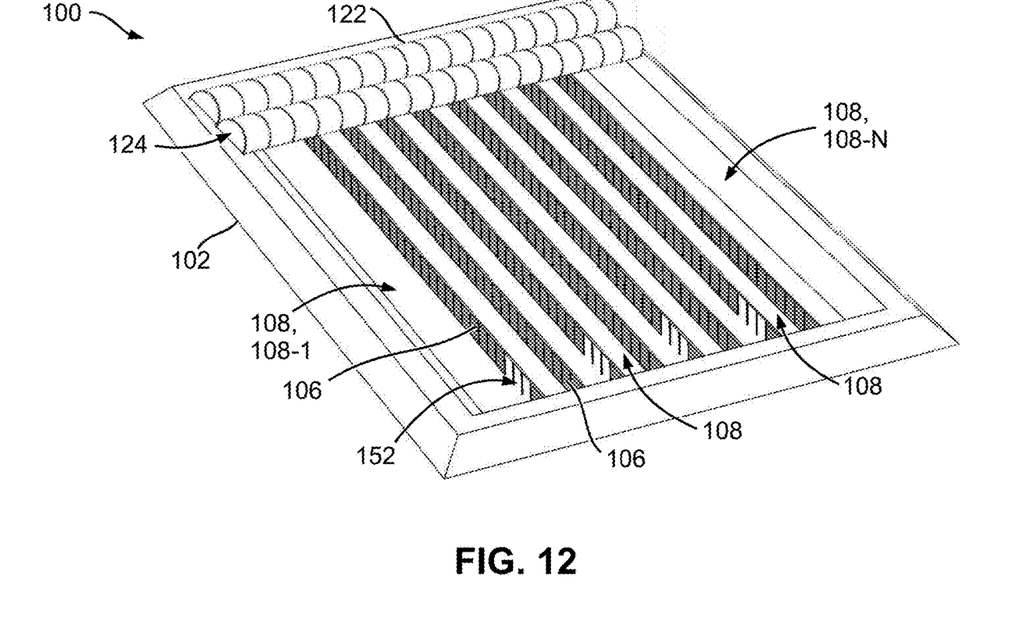
FIG. 12 is a schematic perspective view of a water-treatment apparatus, according to some still further embodiments of this disclosure.

In some embodiments, the apparatus further comprises a wicking material for aiding the rate of evaporation. In a refinement, the wicking material may be formed in portion of the dividing walls, or may be separately located within water treatment zones 108 (ref. FIG. 12)

DETAILED DESCRIPTION

Figure 3A:
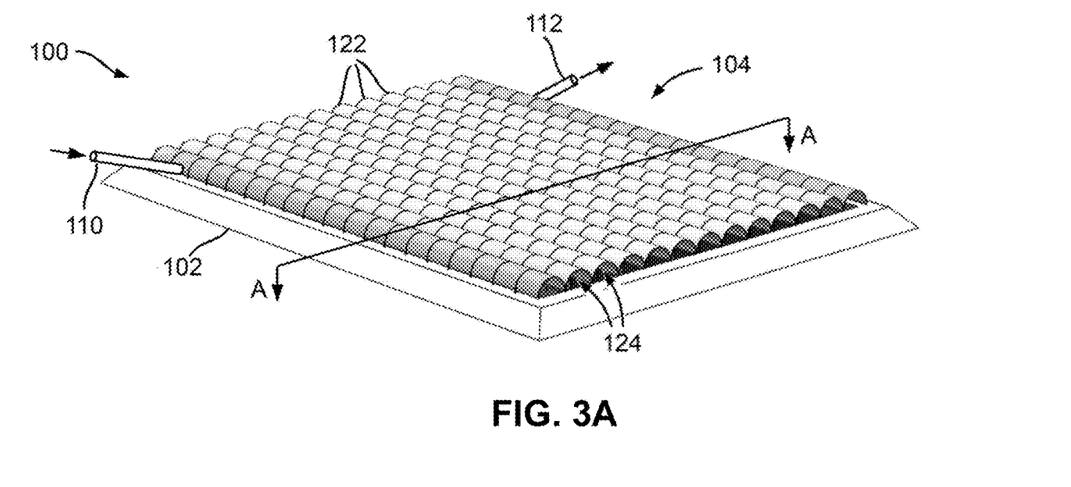
FIG. 3A is a schematic perspective view of a water-treatment apparatus, according to some embodiments of this disclosure, wherein water-treatment apparatus comprises a cover and a plurality of dividing walls.
Figure 3B:
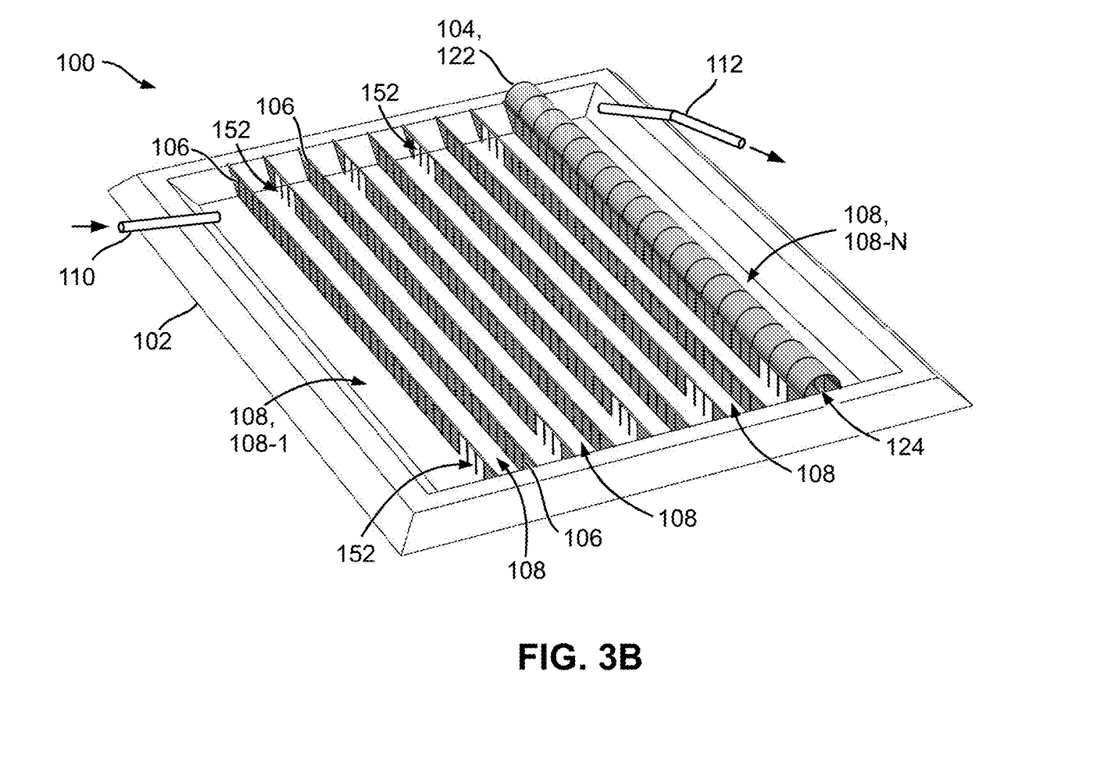
FIG. 3B is a schematic perspective view of the water-treatment apparatus shown in FIG. 3A with one section of the cover shown and other sections of the cover removed for illustrating the dividing walls thereof.

Turning now to FIGS. 3A & 3B, a water-treatment apparatus is shown and is generally identified using reference numeral 100. Herein, the water-treatment apparatus 100 may be installed to a water container 102 such as a water tank, a tailing pond, or the like, for covering the top thereof and for treating the source water therein. A water-proof liner (not shown) may be deployed in the water container 102 for accommodating the source water.

As shown, the water-treatment apparatus 100 comprises a cover 104 for covering the water container 102, and one or more dividing walls 106 received in the water container 102 for dividing the interior space thereof into a plurality of water-treatment zones 108. The water-treatment apparatus 100 also comprises an inlet 110 for injected a source water such as wastewater, sewage, fracking water, produced water, and/or the like into a first water-treatment zone 108-1, and an outlet 112 for discharging treated water from a last water-treatment zone 108-N, where N>1.

The cover 104 may be made of any suitable material such as plastic, polycarbonate, polyvindyl, neoprene, or lexan, composite materials (for example, carbon fiber or fiberglass), aluminum, and/or the like. The cover 104 may be coated with a suitable protective material such as ultraviolet (UV) light protective resin for UV protection and/or strength reinforcement.

Figure 4:
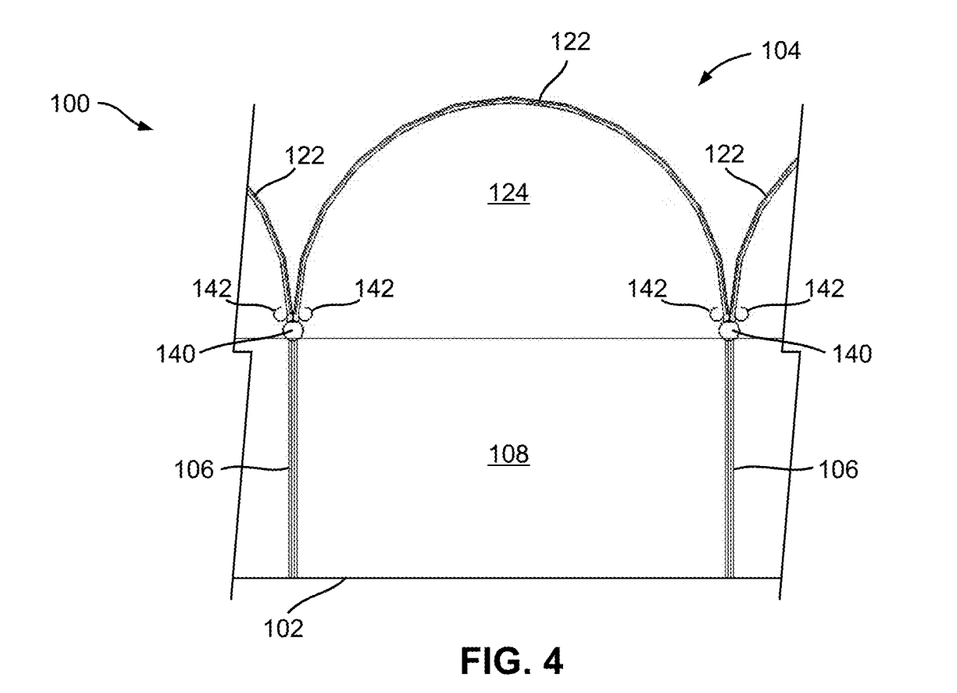
FIG. 4 is a schematic cross-sectional view of a portion of the water-treatment apparatus shown in FIG. 3 along the cross-section line A-A.

In these embodiments, the cover 104 comprises one or more cover sections 122 coupled together and extend along a longitudinal direction in parallel. Each cover section 122 comprises a wall with a convex cross-sectional profile (such as a vaulted wall), that is, extending upwardly and inwardly from the two lateral sides thereof to form a top or peak at a position intermediate the two lateral sides, thereby providing a gas chamber 124 above the water container 102 for facilitating the collection of evaporated water from water being treated. For example, the cover sections 122 shown in FIGS. 3A and 3B have a "dome" profile, that is, having a semi-circular cross-section as shown in FIG. 4 thereby providing a vaulted gas chamber 124. In these embodiments, the inner surface of each cover section 122 form a condensation surface for condensing the steam in the gas chamber 124 evaporated from the source water 134 in the water container 102.

Figure 5:
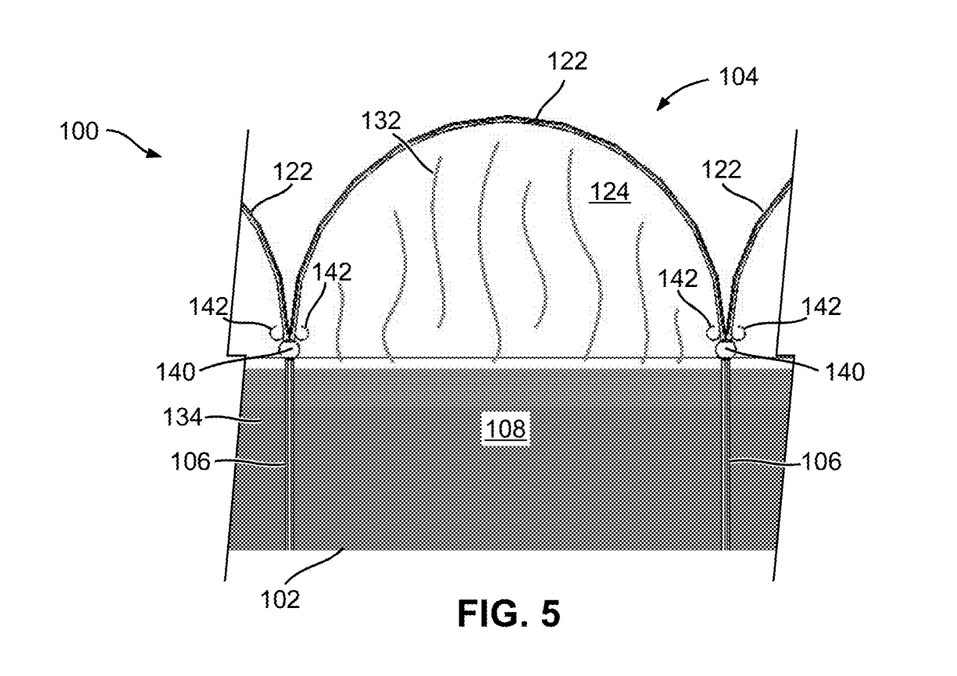
FIG. 5 is a schematic cross-sectional view of the portion of the water-treatment apparatus shown in FIG. 4 showing the water therein and emission therefrom being contained in the gas chamber formed between the cover and the wastewater level in the container.

As shown in FIG. 5, the cover 104 may trap emissions 132 emitted from the source water 134 in the water container 102. Moreover, as shown in FIG. 6, the cover 104 may also protect the water container 102 from foreign objects and additional contaminants 136.

Figure 6:
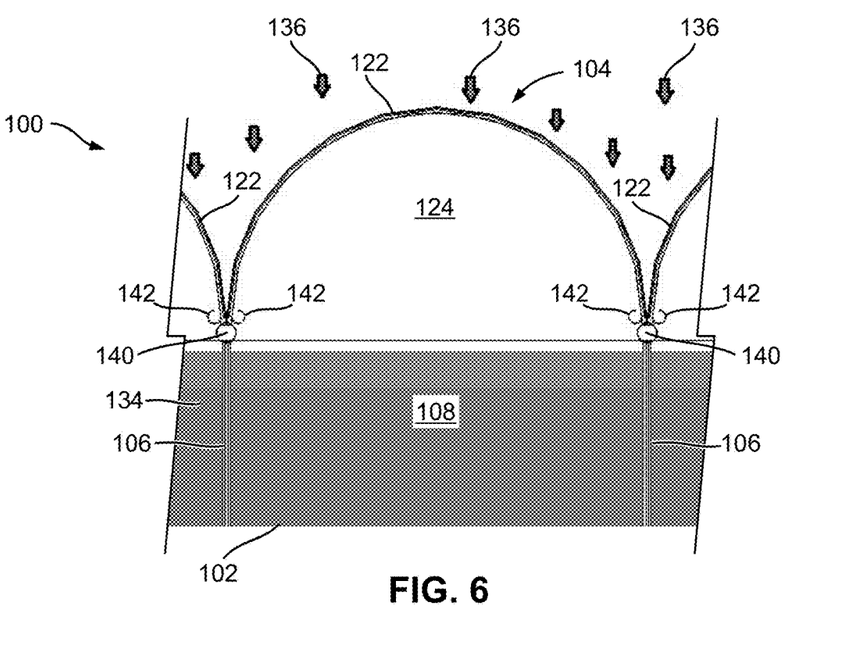
FIG. 6 is a schematic cross-sectional view of the portion of the water-treatment apparatus shown in FIG. 4 showing the contaminated water therein and foreign objects and/or additional contaminants such as snow, sand, hail, or wind-born particles being rejected by the cover of the water-treatment apparatus.

As shown in FIGS. 4 to 6, in these embodiments, each cover section 122 is coupled to and supported by a pair of dividing walls 106 via a pair of longitudinally extending supporting structures 140 thereof (except the two cover sections 122 on the opposite ends, each which may be supported by the sidewall of the water container 102 and one dividing wall 106). At least one longitudinally extending, elongated water-collection channel 142 is coupled to a side of the cover section 122. For example, as shown in FIGS. 4 to 6, a pair of longitudinally extending, elongated water-collection channels 142 are coupled to laterally opposite sides of the cover section 122.

Each water-collection channel 142 comprises an open top for collecting clean water condensed from the steam in the gas chamber 124 evaporated from the source water 134 in the water container 102. The channels 142 are connected to a water reservoir (not shown) for storing collected clean water.

Figure 7:
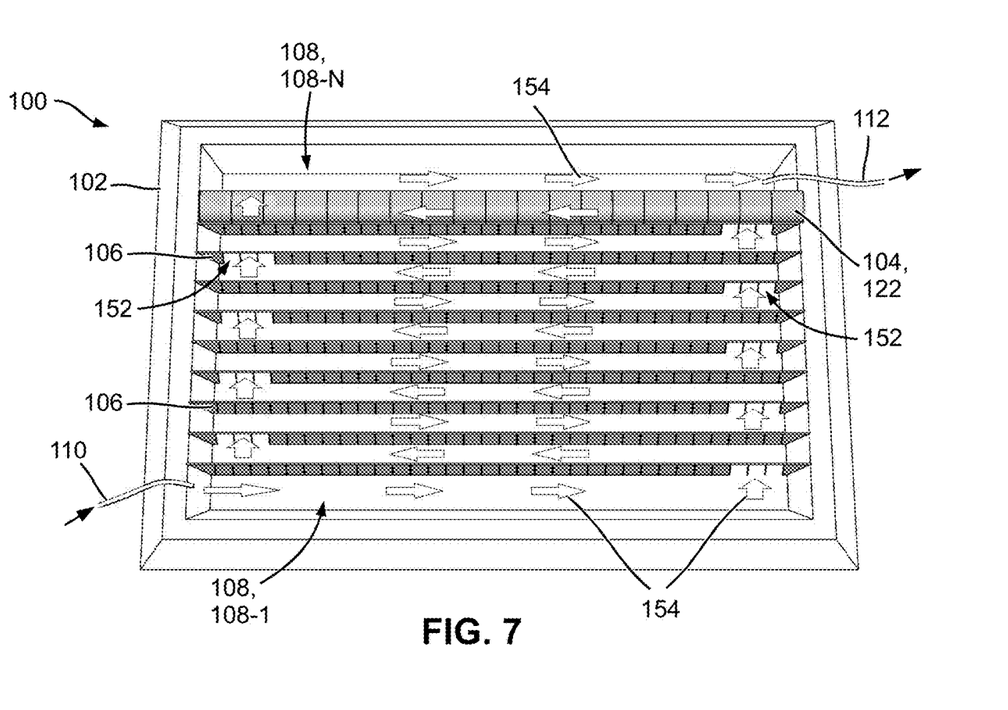
FIG. 7 is a schematic plan view of the water-treatment apparatus shown in FIG. 3 with some sections of the cover removed for illustrating a serpentine, elongated flow-path thereof.

As shown in FIGS. 3B & 7, each dividing wall 106 comprises one or more flow openings 152 for fluid communication between adjacent water-treatment zones thereabout. The one or more flow openings 152 are arranged in a way such that the openings 152 of adjacent dividing walls 106 are longitudinally at a distance from each other, for example, about opposite longitudinal ends thereof. Therefore, the dividing walls 106 create a serpentine, elongated flow-path 154 (as indicated by the block arrows) from the inlet 110 to the outlet 112 through all water-treatment zones 108. While the source water 134 flows through the elongated flow-path 154, some contaminants such as nonorganic solids may separate from the water stream and fall to the bottom of the water container 102 (which may be periodically removed) and some other contaminants such as oil and organic solids may separate from the water stream and rise upwardly in the water container 102 towards the surface for removal through one or more skimming structures (not shown) located, for example, about the water surface. The treated water (with such contaminants removed) is then discharged from the water container 102 through the outlet 112.

Thus, in these embodiments, the water-treatment apparatus 100 has one input of the source water and three outputs including a first output of the condensed clean water (from the water-collection channels 142), a second output of the treated water (from the outlet 112), and a third output of sludge (from the skimming structure). In some embodiments wherein the water container 102 is a water-treatment tank, the water-treatment apparatus 100 may comprise an outlet at the bottom of the water container 102 forming a fourth output for discharging the accumulated solids.

Figure 8:
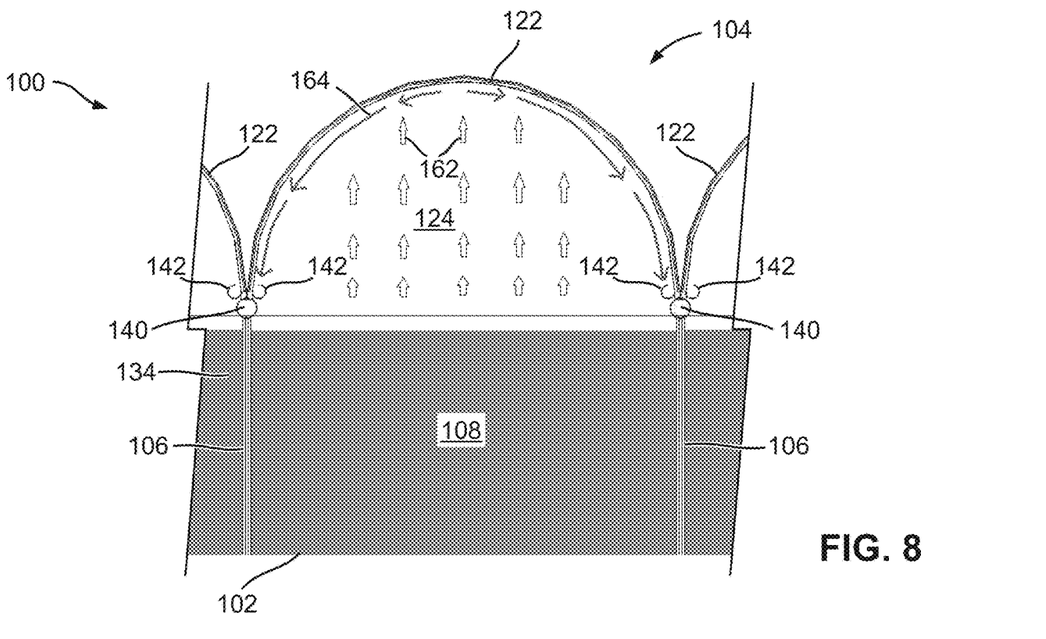
FIG. 8 is a schematic cross-sectional view of the portion of the water-treatment apparatus shown in FIG. 4 showing the water evaporation and collection configuration thereof

As shown in FIG. 8, in operation, while the source water 134 flows from the inlet 110 through the elongated flow-path 154 in the water container 102, the water 134 may evaporate as indicated by the arrows 162, thereby giving rise to steam accumulated in the gas chamber 124. In some embodiments, the cover 104 may be transparent for passing light into the water container for heating the source water in the water container 102 and enhancing evaporation. In some other embodiments, other suitable devices such as solar-powered heaters, wind-powered heaters, and/or other heating devices may be used for heating the source water 134 to enhance the evaporation.

The steam in the gas chamber 124 may condense on the inner surface of each cover section 122 (that is, the condensation surface) and the condensed clean water may flow into the channels 142 on the lateral sides thereof, as indicated by the arrows 164. The channels 142 collect the condensed clean water and direct it to the water reservoir (not shown) for storage and/or use.

Figure 9:
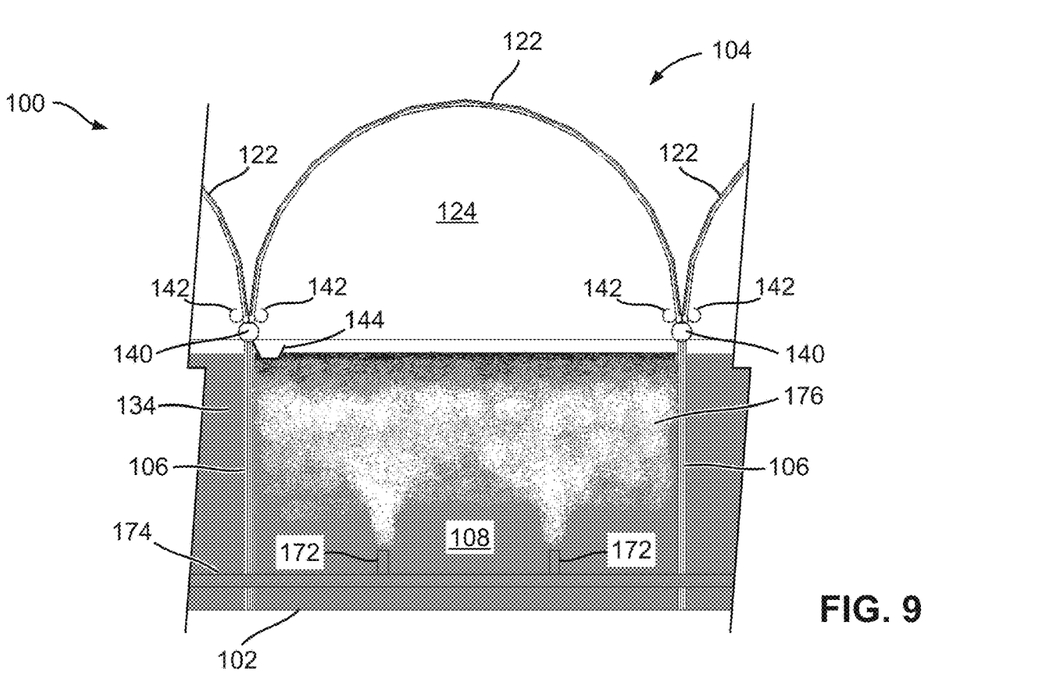
FIG. 9 is a schematic cross-sectional view of the portion of the water-treatment apparatus shown in FIG. 4 showing injection of gas bubbles or microbubbles for treating water therein.

In some embodiments as shown in FIG. 9, the water-treatment apparatus 100 may further comprise a skimming structure 144 or mechanical skimmer located above the surface of the source water 134, and one or more gas inlets 172 at least in some of the water-treatment zones 108. The gas inlets 172 are coupled to a gas conduit 174 for injecting gas bubbles 176 (such as small bubbles or microbubbles) into the source water 134. The gas bubbles 176 agglomerate onto the contaminants (for example, oil, organic solids, and/or the like) in the fluid stream, cause the contaminants to separate from the water stream, rise upwardly in the water container 102 towards the surface, and flow into the skimming structure 144 for removal.

In some embodiments, the injection speed of the gas bubbles 176 may be controlled for facilitating the engagement or adherence of gas bubbles 176 to the contaminants.

In some embodiments, the gas outlets 172 may be oriented to inject gas bubbles towards the downstream direction of the water flow (that is, the downstream direction of the elongated flow-path 154) with a controlled injection speed for facilitating the gas bubbles to engage or adhere to the contaminants in an efficient manner. As is known in the art, gas is more likely to engage or adhere to the contaminants such as oil when the speed and direction of the gas bubbles are similar to those of the water flow 134.

In these embodiments, the gas for creating gas bubbles 176 may be any suitable gas such as air, natural gas, steam, and/or the like.

In some embodiments, the gas may be heated by a suitable heating source such as a solar heater, a burner, a heat exchanger, and/or the like, for producing heated gas bubbles 176 to facilitate water evaporation while carrying contaminants to the surface.

In some embodiments, suitable chemicals may be added for precipitating solids, coagulating contaminants, controlling bacteria, and/or the like.

In some embodiments, instead of or in addition to using gas to generate bubbles 176 in the source water, a blower may be used to blow a "dry" gas, such as air, natural gas, and/or the like without significant water content, across the surface of the source water 134 or slightly below the surface thereof for facilitating water evaporation. The "dry" gas in these embodiments may be heated or unheated.

In some embodiments, the supporting structures 140 are part of the cover 104 and coupled to the lateral ends of adjacent cover sections 122. The dividing walls 106 are hung onto the supporting structures 140 and extend downwardly to or about the bottom of the water container 102 like curtains. In these embodiments, the dividing walls 106 may be made of a light-weight material such as one or more rubber sheets, cloth sheets (for example, sailcloth sheets), and/or the like. In some embodiments, the dividing walls 106 may be weighted (that is, held by suitable weights) or anchored to the bottom of the water container 102.

Figure 10:
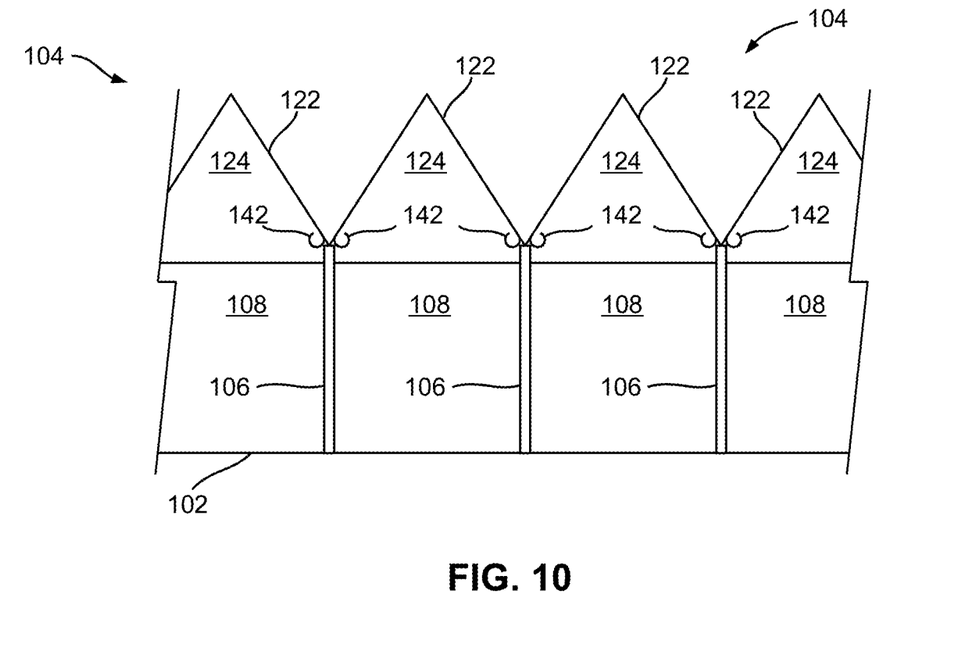
FIG. 10 is a schematic cross-sectional view of a portion of the water-treatment apparatus, according to some other embodiments of this disclosure.

Those skilled in the art will appreciate that, in various embodiments, the cover sections 122 may have other suitable profiles. For example, in some embodiments shown in FIG. 10, the cover sections 122 may have a "peeked" profile with a triangular cross-section.

Figure 11:
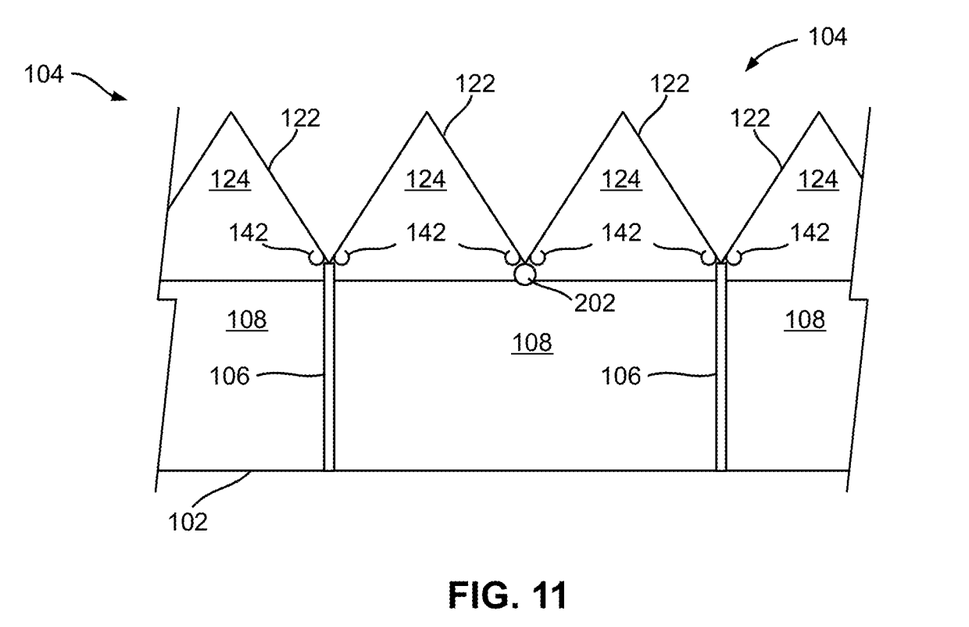
FIG. 11 is a schematic cross-sectional view of a portion of the water-treatment apparatus, according to yet some further embodiments of this disclosure.

In above embodiments, each of the intermediate cover sections 122 (that is, those between the two end cover sections) are coupled to and supported by a pair of dividing walls 106. In some embodiments, some of the intermediate cover sections 122 may be supported by one dividing wall 106 at one lateral side (see FIG. 11) with the other lateral side suspending or floating on the water surface (via suitable floats 202 coupled to the lateral sides of adjacent cover sections 122). In yet some other embodiments, some of the intermediate cover sections 122 may not be supported by any dividing walls 106 and rather suspend or float on the water surface.

In above embodiments, the cover sections 122 extend along a direction parallel to that of the dividing walls 106. In some embodiments, the cover sections 122 and the dividing walls 106 may extend along any suitable directions. For example, in one embodiment as shown in FIG. 12, the cover sections 122 may extend along a direction perpendicular to that of the dividing walls 106.

In above embodiments, all cover sections 122 extend along the same direction. In some embodiments, the cover sections 122 may extend along different directions.

In some embodiments, the cover sections 122 may not be supported by the dividing walls 106. Rather, the cover sections 122 in these embodiments may be supported by other supporting structures such as one or more posts extending from the water container 102.

In some embodiments, the cover sections 122 may not be supported by any supporting structures inside the water container 102. Rather, the cover sections 122 may be directly coupled to and supported by the sidewalls of the water container 102 and/or longitudinal members 140/.

In some embodiments, the cover sections 122 may be supported by one or more supporting structures outside the water container 102.

Figure 13:
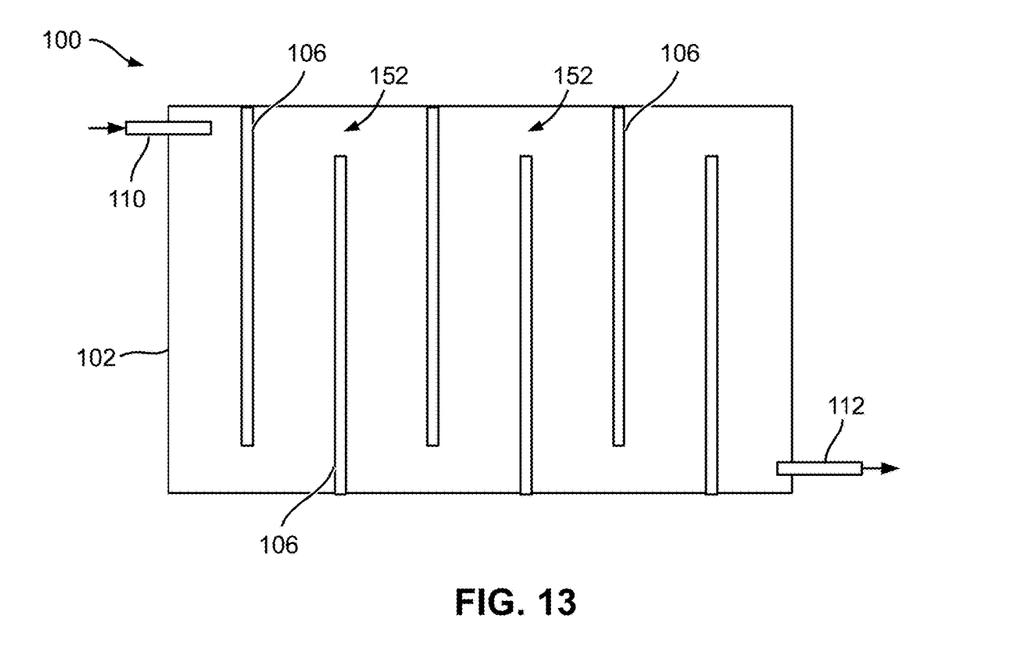
FIG. 13 is a schematic plan view of a water-treatment apparatus, according to some embodiments of this disclosure, wherein the cover is not shown for illustrating the dividing walls thereof.

In some embodiments as shown in FIG. 13, the dividing walls 106 are partial walls extending alternately from opposite sides of the water container 102 to a location at a distance to the other sides thereof with gaps therebetween forming the openings 152.

Figure 14:
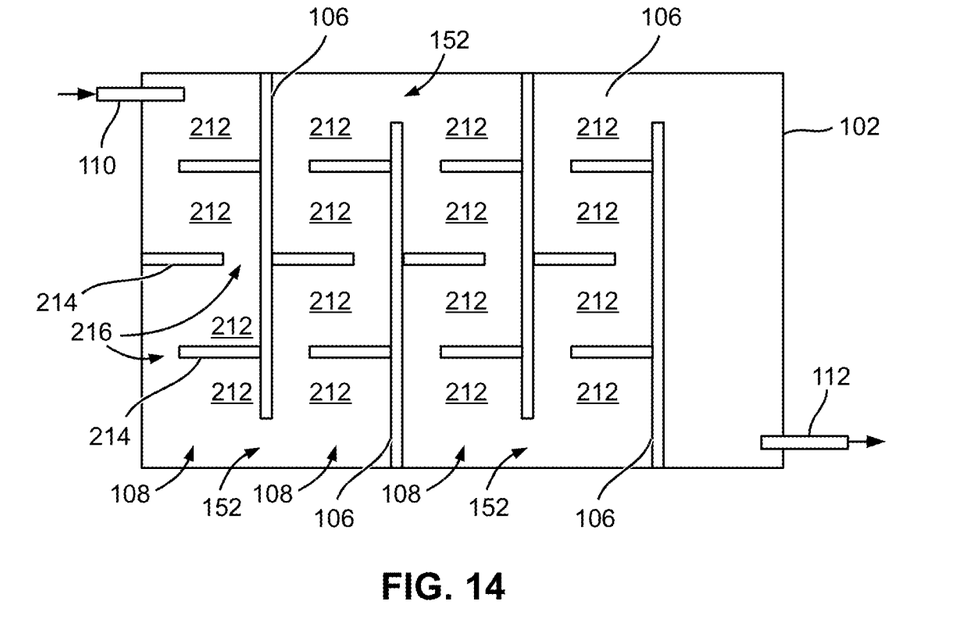
FIG. 14 is a schematic plan view of a water-treatment apparatus, according to some other embodiments of this disclosure, wherein the cover is not shown for illustrating the dividing walls thereof.

In some embodiments as shown in FIG. 14, some water-treatment zones 108 may each be further partitioned into a plurality of fluidly connected water-treatment sub-zones 212 by one or more sub-dividing walls 214 (such as laterally extending sub-dividing walls) with openings 216 for fluid communication. Similar to the openings 152, the openings 216 of adjacent sub-dividing walls 214 may be located at or about opposite ends thereof for increasing the elongated flow-path 154.

Figure 15:
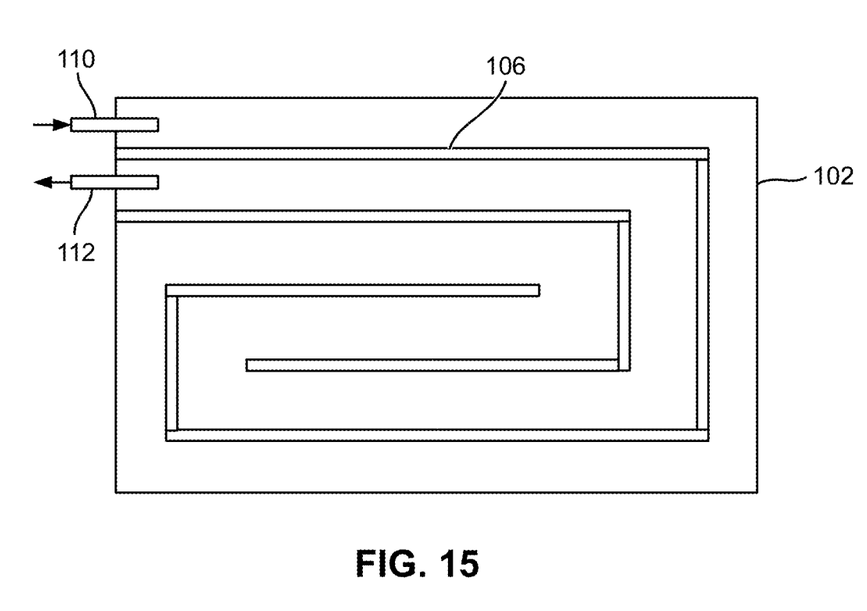
FIG. 15 is a schematic plan view of a water-treatment apparatus, according to yet some other embodiments of this disclosure, wherein the cover is not shown for illustrating the dividing walls thereof.

In above embodiments, the elongated flow-path 154 comprises a plurality of 180° turns. In some embodiments as shown in FIG. 15, the dividing walls 106 are arranged such that the elongated flow-path 154 is generally in a helical or spiral manner with a plurality of turns less than 180° (for example, 90° turns) thereby reducing the number of 180° turns.

Figure 16:
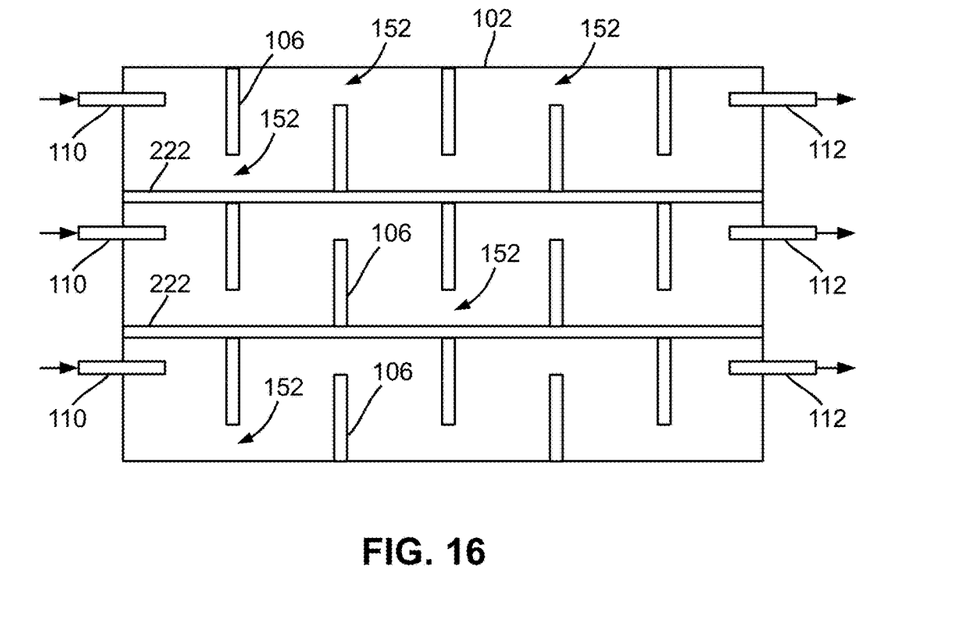
FIG. 16 is a schematic plan view of a water-treatment apparatus, according to still some other embodiments of this disclosure, wherein the cover is not shown for illustrating the dividing walls thereof.

In some embodiments as shown in FIG. 16, the water container 102 may be partitioned into a plurality of sections by one or more partitioning walls 222. Each section comprises an inlet 120, an outlet 112, and one or more dividing walls 106 with openings 152 on or about alternating ends thereof for creating an elongated flow-path therein.

The water-treatment apparatus 100 disclosed herein uses various methods to facilitate the evaporation of the source water 134 to reach a high solubility of water in the air phase, and then strip the condensed water from the air-phase water steam into suitable water collection structures such as the water-collection channels 142.

In some embodiments, the water-treatment apparatus 100 may comprise a suitable heater such as a solar-based heater for heating the source water 134. The cover 122 may be coated with a suitable light-reflective material on the exterior surface thereof to reflect sunlight and maintaining the inner surface in a relatively cool condition to increase condensation.

In some embodiments, the condensation surface such as the inner surface of the cover 122 may be coated with a suitable hydrophobic material, such as oleic acid, polymers, and/or the like, for altering the surface tension to facilitate condensation.

In some embodiments, the condensation surface such as the inner surface of the cover 122 may be prepared or applied with a nano-coating using self-assembled monolayers (SAMs), ion implantation, chemical vapor deposition (CVD), physical vapor deposition (PVD), dip and spin coating, lithography, etching processes, and/or the like, to provide a hierarchical structure of the inner surface thereof with microscale roughness (prompting high contact angles) and nanoscale roughness (prompting low contact angle hysteresis), alter surface tension, increase surface area, and/or the like, and thereby prompting condensation.

Figure 17:
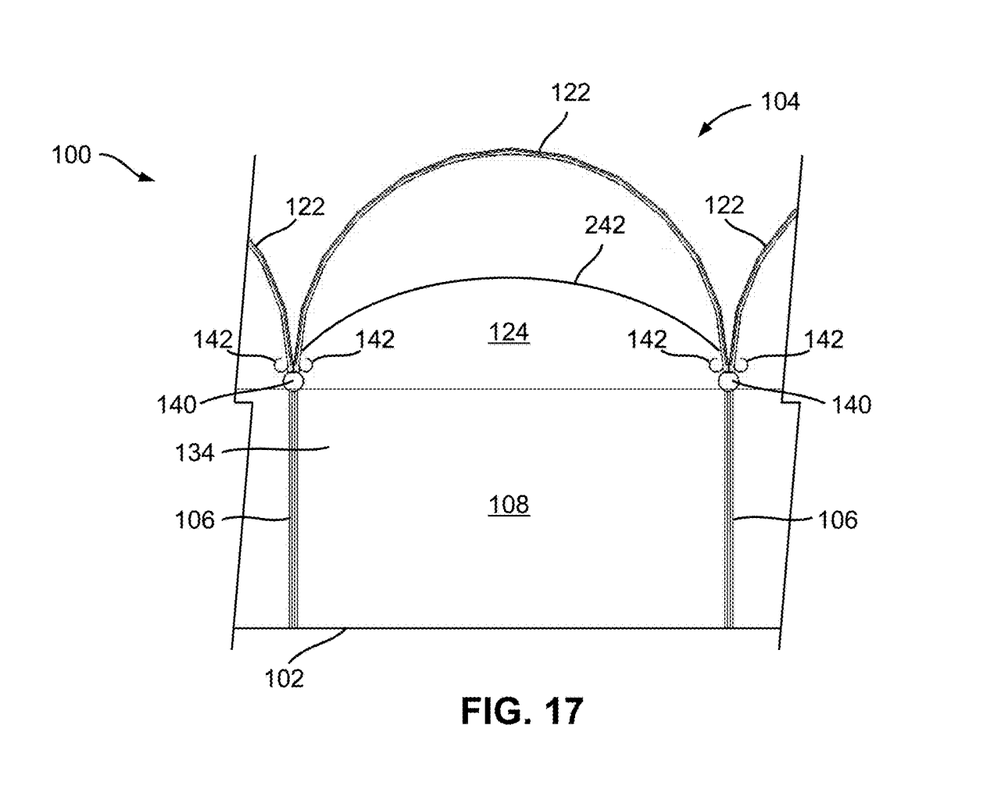
FIG. 17 is a schematic cross-sectional view of a portion of a water-treatment apparatus, according to some embodiments of this disclosure.

In some embodiments as shown in FIG. 17, the water-treatment apparatus 100 may comprise a separate condensation layer 242 above the source water 134, and the longitudinally extending, elongated water-collection channels 142 are coupled to laterally opposite sides of the condensation layer 242. The condensation layer 242 comprises a large condensation surface area for facilitating steam condensation and directing the condensed water into the water-collection channels 142.

In some embodiments, the condensation layer 242 may be a layer comprising one or more packing columns having a suitable packing material, such as coal chips, plastic rings, stone chips, wood chips, and/or the like, for facilitating steam condensation and directing the condensed water into the water-collection channels 142.

In some embodiments, the water-treatment apparatus 100 may comprise a humidity-control structure for controlling the humidity in the gas chamber 124 for further facilitating the evaporation-condensation process. The humidity-control structure may comprise a gas inlet for injecting a suitable "dry" gas (that is, a gas with no or ignorable amount of water steam) into the gas chamber 124 in a controlled rate, and a gas outlet with a dehumidification component for removing water from the gas and discharging the "dried" gas which may be circulated back to the gas inlet for reuse.

Figure 18:
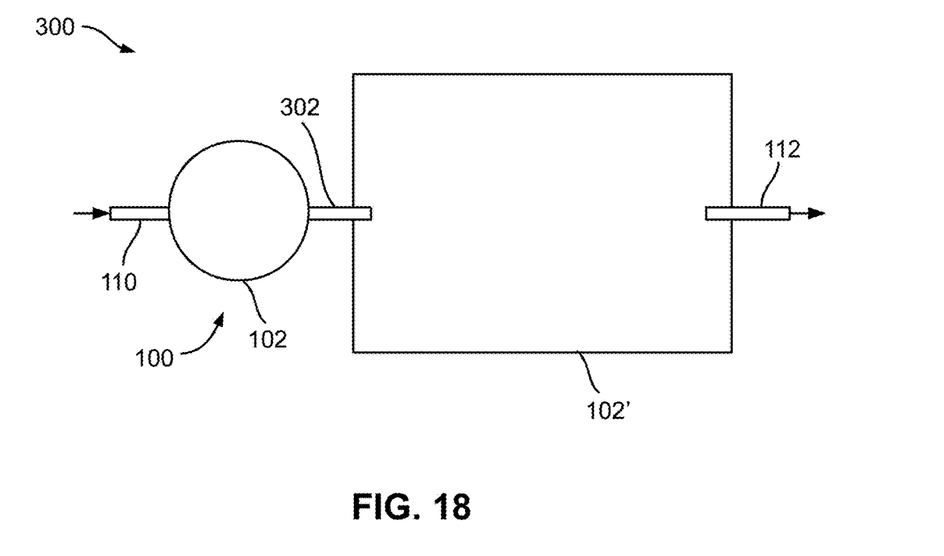
FIG. 18 is a schematic plan view of a water-treatment system, according to some embodiments of this disclosure.

In above embodiments, the water container 102 may be a tank, a pond, or the like. In some embodiments as shown in FIG. 18, water-treatment system 300 may comprise a water-treatment apparatus 100 having a tank 102 such as an above-surface tank (AST) which may be quickly deployed beside an open-top or uncovered pond 102'. The tank 102 and/or pond 102' may have a water-proof liner (not shown) deployed therein for accommodating the source water therein. A conduit 302 fluidly connects the tank 102 and the pond 102' for directing the water treated in the tank 102 into the pond 102'. In these embodiments, the pond 102' is generally used for further treating the water received from the tank 102 such as further precipitating the solids (which may be periodically removed) and evaporating the water to obtain a concentrated brine for outputting from the outlet 112.

Figure 19:
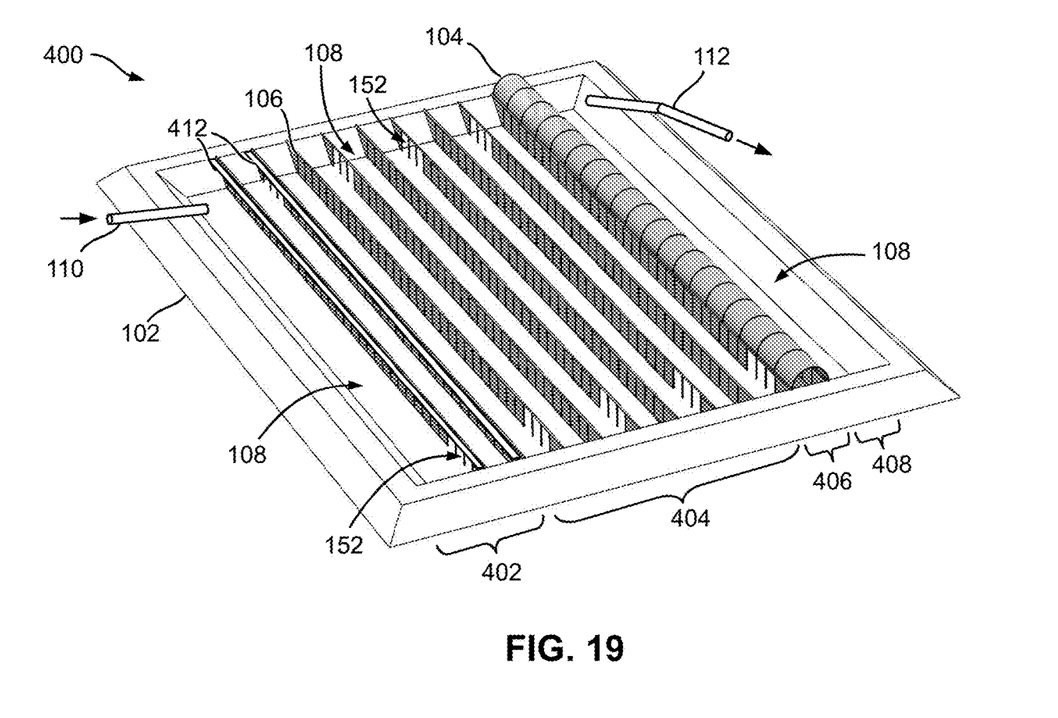
FIG. 19 is a schematic perspective view of a water-treatment apparatus having a plurality of water-treatment sections, according to some embodiments of this disclosure.

In some embodiments as shown in FIG. 19, a water-treatment system 400 may partition a water container 102 such as a tank or a pond into a plurality of water-treatment sections 402 to 408 using a plurality of dividing walls 106 having openings 152 for fluid communication between adjacent water-treatment sections. Each water-treatment section may also be partitioned into a plurality of water-treatment zones 108.

An inlet 110 injects a source water into the first water-treatment section 402 for removing light contaminants such as oil using one or more skimming structures 412. A suitable gas may also be introduced into the first water-treatment section 402 for generating bubbles for facilitating removal of the light contaminants. The first water-treatment section 402 may be covered or uncovered.

After removing oil, the source water is introduced into the second water-treatment section 404 for solids precipitation and/or mineral removal, such as by addition of chemicals to remove iron The solids-removed water is then introduced into the third water-treatment section 406. The second water-treatment section 404 may be covered or uncovered.

The third water-treatment section 406 is similar to the water-treatment apparatus 100 described above and may comprise a cover 104 having one or more cover sections 112 for evaporation-condensation as described above.

The fourth water-treatment section 408 may be an uncovered or covered section for storing the treated water and discharging the treated water via an outlet 112.

In some embodiments, the water-treatment system 400 may not comprise the fourth water-treatment section 408 and may directly discharge the treated water from the third water-treatment section 406.

In some embodiments, the first and second water-treatment sections 402 and 404 may be combined into one water-treatment section for oil removal and solids precipitation.

Although embodiments have been described above with reference to the accompanying drawings, those of skill in the art will appreciate that variations and modifications may be made without departing from the scope thereof as defined by the appended claims.

What is claimed is:

1. An apparatus for treating a contaminated source water therein by evaporation and subsequent condensation, comprising:
   a container defining an inner volume for treatment of contaminated source water;
   a plurality of substantially vertical spaced-apart dividing walls, each dividing wall longitudinally extending within said interior volume of the container, adjacent pairs of said dividing walls partitioning the interior space of the container into a plurality of water-treatment zones between respective pairs of said dividing walls, each dividing wall comprising one or more first openings for fluid communication between adjacent water-treatment zones; and a plurality of cover members extending respectively longitudinally along or across each of said pairs of dividing walls and above each of said pairs of dividing walls, the cover members each comprising a vaulted cover section for defining a gas chamber above each of the pairs of spaced-apart dividing walls, mutually-opposite side edges of said cover members respectively extending upward from side edges of said spaced-apart dividing walls;

wherein each vaulted cover section comprises:

an inner condensation surface in association with and forming part of the gas chamber and adapted for condensing thereon a water vapour evaporated from the contaminated source water in the water container by application of sunlight or a heat source to the contaminated water and which resulting water vapour rises in the gas chamber; and a water collection channel coupled to at least one lower side edge of the inner condensation surface of each vaulted cover section, which is adapted to collect condensed water vapour which drains via gravity down from said vaulted cover section into said water collection channel associated with each water treatment zone.

2. The apparatus of claim 1, wherein said one or more openings in each dividing wall comprises a single aperture situated at a mutually opposite end of each of adjacent pairs of said spaced-apart dividing walls.

3. The apparatus of claim 1, wherein the inner condensation surface is a condensation layer separated from the corresponding cover section.

4. The apparatus of claim 3, wherein the condensation layer comprises one or more packing columns for facilitating condensation of said water vapour and directing the condensed water vapour into the at least one water-collection channel.

5. The apparatus of claim 4, wherein the one or more packing columns comprise at least one of coal chips, plastic rings, stone chips, and wood chips.

6. The apparatus of claim 2, wherein the condensation surface is coated with a hydrophobic material for altering the surface tension to facilitate condensation.

7. The apparatus of claim 6, wherein the hydrophobic material comprises oleic acid and/or polymers.

8. The apparatus of claim 1, wherein the condensation surface is applied with a nano-coating for prompting condensation.

9. The apparatus of claim 8, wherein the nano-coating is applied to the condensation surface using at least one of self-assembled monolayers (SAMs), ion implantation, chemical vapor deposition (CVD), physical vapor deposition (PVD), dip and spin coating, lithography, and etching processes for prompting condensation.

10. The apparatus of claim 1, wherein the cover comprises at least one of a plastic material, a polycarbonate material, a composite material, and aluminum.

11. The apparatus of claim 10, wherein the composite material comprises carbon fiber or fiberglass.

12. The apparatus of claim 1, wherein the cover members are coated with a protective material UV protection and/or strength reinforcement.

13. The apparatus of claim 1, wherein the cover members are coated with a light-reflective material on an exterior surface thereof.

14. The apparatus of claim 1, wherein at least one of the vaulted cover sections is transparent.

15. The apparatus of claim 1, wherein each of the cover members extend respectively along a direction parallel to and along each of said pairs of dividing walls.

16. The apparatus of claim 1, wherein the cover members extend along a direction perpendicular to each of the pairs of dividing walls.

17. The apparatus of claim 1, wherein each vaulted cover section comprises a semi-circular cross-section.

18. The apparatus of claim 1, wherein each cover section is configured for coupling to one of the one or more dividing walls.

19. The apparatus of claim 1, wherein one edge of at least one cover section is coupled to a float.

20. The apparatus of claim 1, wherein the first openings of adjacent dividing walls are longitudinally at a distance from each other for creating a serpentine, elongated flow-path.

21. The apparatus of claim 20, wherein the first openings of adjacent dividing walls are located about opposite longitudinal ends thereof for creating a serpentine, elongated flow-path.

22. The apparatus of claim 1 further comprising:
one or more skimming structures for collecting contaminants separated from the source water and rising upwardly to the surface.

23. The apparatus of claim 1 further comprising:
a first heating component for heating the source water for evaporation.

24. The apparatus of claim 1 further comprising:
one or more gas inlets in one or more of the plurality of water-treatment zones for injecting a first gas thereinto for forming gas bubbles in the source water.

25. The apparatus of claim 24, wherein a speed of injecting the first gas is controllable.

26. The apparatus of claim 24, wherein the first gas is injected towards a downstream direction of a flow of the contaminated source water.

27. The apparatus of claim 24, wherein the first gas comprises at least one of air, natural gas, and steam.

28. The apparatus of claim 24 further comprising:
a second heating component for heating the first gas.

29. The apparatus of claim 1 further comprising:
a blower for blowing a second gas across a surface of the source water or below the surface thereof.

30. The apparatus of claim 1 further comprising:
one or more supporting structures;
wherein each cover section is coupled to at least one of the one or more supporting structures.

31. The apparatus of claim 30, wherein the one or more supporting structures are configured for positioning outside the water container.

32. The apparatus of claim 30, wherein the one or more supporting structures comprise at least one post.

33. The apparatus of claim 30, wherein the one or more supporting structures are longitudinally extending; and
wherein each dividing wall is configured for extending downwardly from one of the one or more supporting structures.

34. The apparatus of claim 33, wherein said one or more longitudinally supporting structures further support a respective of said water collection channels of each vaulted sections of each of said plurality of cover members.

35. The apparatus of claim 1, wherein each dividing wall comprises one or more rubber sheets and/or cloth sheets.

36. The apparatus of claim 1, wherein each dividing wall is coupled to a weight for anchoring the dividing wall in the water container.

37. The apparatus of claim 1 further comprising:
one or more sub-dividing walls coupled to at least one of the one or more dividing walls for subdividing one or more of the plurality of water-treatment zones, each of the one or more sub-dividing walls comprising one or more second openings for fluid communication.

38. The apparatus of claim 1, wherein the dividing walls and the first openings are configured for forming an elongated flow path having a plurality of 180° turns.

39. The apparatus of claim 1, wherein the dividing walls and the first openings are configured for forming an elongated flow path having a plurality of turns less than 180°.

40. The apparatus of claim 1 further comprising:
a humidity-control structure for controlling humidity in the one or more gas chambers.

41. The apparatus of claim 1 further comprising:
a water-proof liner for deploying in the water container.

42. The apparatus of claim 1, further comprising a wicking member adapted to contact said source water and aid evaporation of said water from said source water.

43. The apparatus as claimed in claim 42, wherein said wicking member is part of, or contained within, one or more of said dividing walls.

* * * * *